(No Model.)
C. P. WHITE.
CLUTCHING DEVICE.
No. 317,056. Patented May 5, 1885.
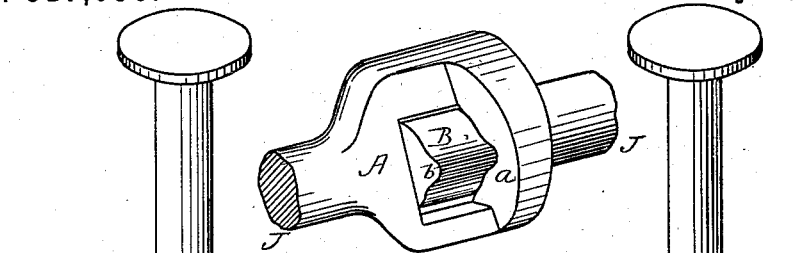
Fig. 1.
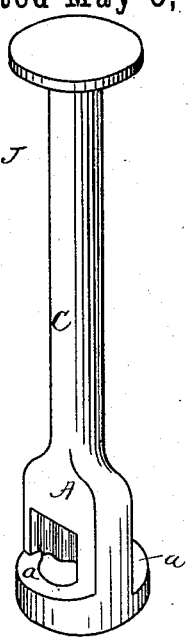
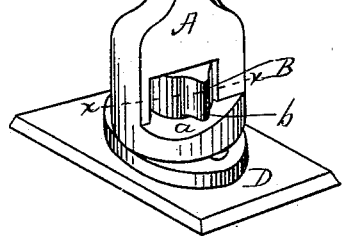
Fig. 2.
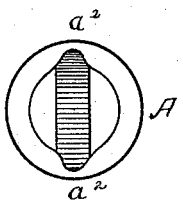
Fig. 4.
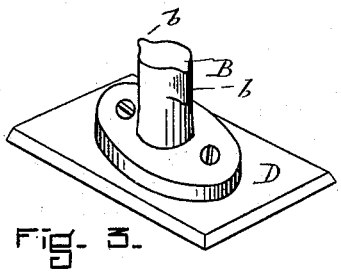
Fig. 5.
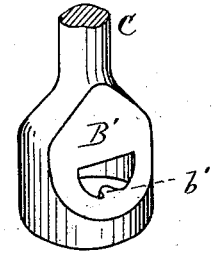
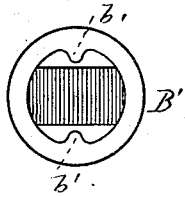
Fig. 7.
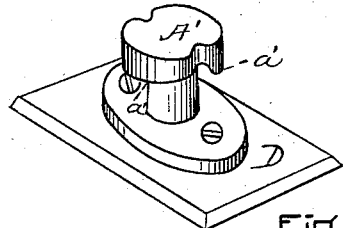
Fig. 5.
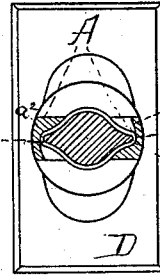
Fig. 6.
Fig. 8.
WITNESSES.
W. B. Wright
H. E. Barry
INVENTOR
Chas. P. White
by Wm. A. H. Downs
his atty

UNITED STATES PATENT OFFICE.

CHARLES P. WHITE, OF TAUNTON, MASSACHUSETTS.

CLUTCHING DEVICE.

SPECIFICATION forming part of Letters Patent No. 317,056, dated May 5, 1885.

Application filed March 20, 1885. (No model.)

*To all whom it may concern:*

Be it known that I, CHARLES P. WHITE, of Taunton, in the county of Bristol, in the State of Massachusetts, have invented an Improvement in Mechanical Powers or Clutching Devices, of which the following is a specification.

My improvement relates to clutches or devices adapted to form a union or coupling between two parts, whereby one part may grapple the other or transmit motion, and it is so arranged and constructed that the union may be easily broken and the parts disengaged. Clutches of this kind are especially adapted, when combined with a suitable handle, to certain classes of work in foundries, especially in drawing or lifting patterns from the sand in molding, and, as will be more fully hereinafter described, I have shown an adaptation of my invention for this purpose. It also forms a very advantageous union between a journal and a crank for an instrument or machine when it is desirable to frequently detach the crank for any purpose, and, in fact, its uses are obvious for any purpose wherein a clutch is desirable for the transmission of power or any other purpose. It is to be noticed that the clutch not only forms a union which can be a coupling for shafting, but that the parts are united longitudinally and cannot be pulled apart, also that the parts lock themselves together firmly by the action of the lugs on the cam-faces.

In the accompanying drawings, Figure 1 is a perspective view of my invention. Fig. 2 is a perspective view of the same locked, arranged with a handle, and adapted for lifting patterns in molding. Fig. 3 is a perspective view of the same parts separated, as shown in Fig. 2. Fig. 4 is a plan view of the uniting end of the part A. Fig. 5 is a perspective view of a modified form of my invention. Fig. 6 is a perspective view of the parts shown in Fig. 5 united. Fig. 7 is a plan view of the uniting end of the part B'; and Fig. 8 is a horizontal sectional view on line $x\,x$ of Fig. 2, the lugs $b\,b$ resting against the inner walls or cam-faces of the arms of the member A.

My improved clutch consists of two parts, and, as shown in Fig. 1, which is the manner in which I preferably make it, one part or member is designated by A, the other by B. The member A consists of a ring or collar connected by arms to the shaft, handle, or journal J. The outer face of this collar or band is shown in Fig. 4, where $a^2$ indicates slots or grooves adapted to receive the lugs $b$ of the member B. The upper or inner edge of the collar is provided with the cam-faces $a\,a$, which are arranged relatively to each other similar or corresponding to the threads of a screw, in this particular figure to a right-handed screw, though left-handed faces would act the same. These cam-faces are the surfaces upon which the lugs $b\,b$ of the member B wedge themselves and become, so to speak, locked. I preferably make the left side of the grooves $a^2$ so that they do not permit the lugs $b$ to pass, so that in case of the use of right-handed cam-faces $a\,a$ the plug cannot move to the left.

The member B consists, simply, of a plug with the lugs at one end, as shown. This plug can be made either with or without a base-plate, in accordance with the purpose for which it is intended to be used. If the member B is intended to be used as a draw-plug and to be attached to a pattern in foundry-work, I preferably make it in one integral piece with a base-plate, and cause the plug to be slightly cone-shaped or longer at the base, to afford a draft in sand-molding.

In Fig. 5 I have shown a modification of my invention whereby the cam-faces are placed on the plug, which terminates in a head having the faces $a'\,a'$ on its inner edge. The lugs $b'\,b'$ are placed in the member B' and operate on the cam-faces $a'\,a'$. The plug A' is made with the grooves to allow it to be inserted into the member B' past the lugs $b'\,b'$.

D represents a pattern, to which the plug is attached in any suitable way, as by screws through the base-plates of the plug or by fixing the plug directly in a hole of the pattern.

The operation of my invention is as follows: It being desired to form a union which can be easily broken between any parts, the member A is thrust over the member B until it is stopped by coming in contact with the end of the plug and is then simply turned to the right, by which operation the cam-faces are brought under the lugs of the member B and firmly locked.

The operation in the modification I have shown is similar only that when the member B' is turned after having been thrust over the member A' the lugs $b'$ wedge on the faces $a'\ a'$.

I preferably make my improvement of any suitable metal, either casting it in iron or steel. In the adaptation I have shown of my improvement for lifting patterns the handle C is cast in one integral piece with the member A. I preferably also use the form of the clutch shown in Fig. 1, as the castings are easily made and the action natural.

It will be obvious that the cam-faces could be inclined either to the right or left and that the operation would be the same.

Having now fully described my invention, what I desire to claim is—

1. A clutch provided with lugs and cam-faces, whereby the members are united and locked, substantially as described.

2. A clutch consisting of the member A, provided with the cam-faces $a\ a$, and the member B, provided with the lugs $b\ b$, substantially as described.

3. A draw-handle, C, provided with the member A, having cam-faces, in combination with the draw-plug B, having the lugs $b\ b$, substantially as and for the purpose described.

4. A clutch consisting of the member A, provided with cam-faces $a\ a$ and grooves $a^2\ a^2$, and the member B, provided with the lugs $b\ b$, substantially as described.

In witness whereof I have hereunto set my hand.

CHAS. P. WHITE.

Witnesses:
 WM. B. H. DOWSE,
 H. E. BARRY.